(12) United States Patent
Vasell

(10) Patent No.: US 6,415,333 B1
(45) Date of Patent: Jul. 2, 2002

(54) DISTRIBUTED COMMUNICATION SYSTEM WITH CATEGORIZED RESOURCES

(75) Inventor: Jesper Vasell, Göteborg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/207,887

(22) Filed: Dec. 8, 1998

(30) Foreign Application Priority Data

Dec. 8, 1997 (SE) .............................................. 9704565

(51) Int. Cl.[7] .......................................... G06F 15/163
(52) U.S. Cl. ...................... 709/315; 709/201; 709/310; 709/313; 709/316
(58) Field of Search ................................ 709/201, 310, 709/313, 315, 316

(56) References Cited

U.S. PATENT DOCUMENTS

| | | | |
|---|---|---|---|
| 4,694,396 A | | 9/1987 | Weisshaar et al. |
| 5,133,053 A | | 7/1992 | Johnson et al. |
| 5,742,848 A | * | 4/1998 | Burgess ........................ 710/36 |
| 5,848,272 A | * | 12/1998 | Breggin et al. ............. 709/303 |
| 5,995,999 A | * | 11/1999 | Bharadhwaj ................. 709/200 |
| 6,049,838 A | * | 4/2000 | Miller et al. ................. 709/303 |

FOREIGN PATENT DOCUMENTS

| | | |
|---|---|---|
| EP | 0 201 063 | 11/1986 |
| EP | 0 201 065 | 11/1986 |

* cited by examiner

Primary Examiner—Saleh Najjar
(74) Attorney, Agent, or Firm—Burns, Doane et al.

(57) ABSTRACT

A distributed communication system includes a number of nodes, each including a number of resources, which nodes are interconnected by an interconnection network. Distributed applications are executed through sending messages between resources in the nodes. The resources are categorized into a number of function types. Resources grouped into one and the same function type are functionally equivalent at least to a given extent so that a number of function type instances are provided for each function type. Each node includes an information holding device keeping information about which function type instances correspond to a given function type and distribution functions associated with the information holding device for selecting a receiving function type instance among the available instances. A resource sending a message only has to give the function type as address information, and the distribution function selects which function type instance will be the receiver.

23 Claims, 8 Drawing Sheets

DISTRIBUTED COMMUNICATION SYSTEM WITH CATEGORIZED RESOURCES

This application claims priority under 35 U.S.C. §§119 to Application No. 9704565-2 filed in Sweden on Dec. 8, 1997; the entire content of which is hereby incorporated by reference.

BACKGROUND

The present invention relates to a distributed communication system which comprises a number of nodes and said nodes are interconnected via an interconnection network. Each node comprises a number of resources such as for example processing resources, in/output resources, storing resources and distributed applications are executed through sending of messages between the resources in said nodes. The invention also relates to a node in a distributed network configuration, which node comprises a number of resources and communicates with other nodes via said interconnection network.

The invention still further relates to a method for sending messages in a distributed communication system comprising a number of nodes interconnected via an interconnecting network wherein each node comprises a number of resources. The invention also relates to a method of providing communication among user applications executing at resources located in different nodes in a distributed network through the sending of messages.

In a distributed system, which means a system based on a computer platform comprising a number of computer nodes interconnected through an interconnecting network a number of specific problems arise which mainly are related to the communication between resources or entities such as processes, threads, queues, residing at different nodes. Such problems among others relate to the communication between resources or entities, i.e. what operations are/should be available for communication and what are the semantics of such operations. Another issue relates to the detection of failures in a computer node and how the system reacts thereon. Still another important issue relates to the adaption of the system to changes in the available resources such as for example when nodes are added, removed etc.

Systems implementing location transparent message passing are known. Location transparent message passing means that an entity or a resource which sends a message to another resource (a process, a thread or similar) in a distributed system does not have to know anything about the actual location of the receiving entity but merely a name is used to refer to the receiving entity and underlying software layers handle the location dependent parts of the communication. Basically two different types of location transparent message passing are known. Depending on the name that is used slightly different semantics in the message passing procedures are produced.

In a first case, the name refers to a specific resource or entity which has a particular name. In that case the name is bound to the specific entity and the name is regarded invalid if the actual entity disappears even if another entity reappears under one and the same name. This means that the life time of the name and the entity it denotes is the same.

The second case relates to a name referring to any entity which has the particular name. This means in practice that an entity carrying a given name may disappear and a new entity may be created using the same name. Both these kinds of naming provides for location transparency but they differ in the way entities or resources may relocate in the system. In the first case only migration is permitted which means that an entity or a resource is actually moved and it does not allow destruction of an entity at one location and creation of a new entity at a new location which however is allowable in the second case. Most of the distributed systems are generally location transparent or even weaker which means that both the name and the location of the receiving entity has to be given. U.S. Pat. No. 5,133,053 shows an example on a system implementing location transparent message passing.

However, even if location transparent message passing actually is implemented this does not enable the provision of a truly scalable and fault tolerant distributed system. Scalability and tolerance to failures are two related properties since both of them are concerned with the behaviour of the system when changes occur in the available resources of the system. The same mechanisms are involved irrespectively of whether a resource such as for example an entire computer node is removed or whether it is added. Adaption means that an application should start employing an added node which means that it, or rather the entities residing on it, should become visible in the address space that is used when communicating in the system. Adaption means that the entities which existed on a removed node also should disappear from the communication address space.

FIG. 1A illustrates a location transparent system in which a thread named T1 sends a message to another thread named T2. Since the system applies location transparency, the sending thread T1 does not have to know the exact location of the destination thread, e.g. it does not have to know at which computer node the receiving thread T2 resides but it is sufficient with the name T2.

FIG. 1B illustrates a case when T2 has disappeared from the system. This could for example be the case if a failure had occurred in node 3. However, this fact is effectively hidden to the sending thread T1 because of the location transparency and T1 still attempts to send the message using the name T2 to refer to the destination. However, the name T2 is now invalid.

Depending on which is the communication mechanism, the behaviour in such a situation may differ but at best the sending thread is notified of the failure to deliver the message. The communication, even in the best case, do thus not offer any fault tolerance in itself but it merely gives the application, here the sending thread T1, information about the failure.

FIG. 1C illustrates the case when the disappeared thread T2 reappears at another node (here node 2). The location transparent message passing scheme will then automatically adjust to such a situation on condition that the reappearing thread has the same name, namely T2, as the disappeared thread.

Finally, FIG. 1D illustrates a situation with two instances of a thread T2, which means that two threads are functionally equivalent to the extent that they both are possible receivers of a message sent by T1. Through adding one more thread with the same functionality, the throughput of the application could potentially scale up. This scaling, however, does not mean that the application has to be rewritten, it is merely a question of creating one more copy of a thread. The main drawback is that, if location transparent communication, or any weaker form of communication, is used, the performance scaling will not take place since T1 still explicitly addresses T2 when sending messages.

Through the examples as illustrated in FIGS. 1A–1D, it becomes evident that location transparent message passing can handle situations in which the locality of a thread changes. However, it can not to a satisfactory extent handle situations with disappearing threads; in a way which makes a distributed application fault-tolerant. Furthermore scalability of an application is not supported since the application code is written to take advantage of specific, explicitly named resources (threads in the examples referred to above) and the addition of new resources requires the making of changes in the application code.

SUMMARY

What is needed is therefore a distributed communication system which is efficient and easy to implement. Particularly a system is needed which permits scalability, i.e. that at least to a desired extent enables the use of newly added nodes or resources or similiar and which can handle the situation when nodes or resources are removed, when failures occur etc., i.e. a system which is tolerent to failures. In other words a system is needed which can handle an evolving system and when changes occur in the system and which efficiently can take advantage of the changes or handle the situation when errors occur.

A node is also needed which operates in a distributed environment and which fulfills the above mentioned objects and wherein a mechanism for sending of messages is used enabling the objects as referred to above to be achieved.

Furthermore a method of sending messages in a distributed communication system is needed which is efficient, allows scalability and which enables the handling of failures, i.e. which enables fault tolerant distribution of messages. Furthermore a system, a node and a method respectively is needed which is easy to manage.

Therefore a distributed communication system as initially referred to is provided wherein the resources are categorized or grouped into a number of function types. Resources which are grouped into one and the same function type are functionally equivalent at least to a given extent so that they all are possible receivers of a message intended for a resource of the function type. A number of function type instances, each corresponding to a particular resource, or type instance are provided for each function type. Each node furthermore comprises information holding means keeping information about which resourses/function type instances that correspond to a given function type and a distribution function is associated with said information holding means and selects a receiving function type instance among the instances available in the information holding means. For sending a message from a sending node, only the function type of the receiving resource is given as address information and the distribution function selects which function type instance will be the actual receiver among the function type instances associated with the input function type so that messages from a sending resource are sent independently of the location of the rescources with which a sending resource communicates as well as independently of the number and names thereof. Examples of resources are processing resources, input/output resources and storing resources.

Distribution state information is held in each node, particularly each computer node, regarding the currently available entities of any function type that some entity at the node has declared its intention to communicate with. Alternatively distribution state information can be held without any declaration about intention to communicate with particular function types. Advantageously the information holding means are updated, particularly continuously, so that in each node information is provided about which resources of at least a number of function types that actually are available for messages addressing the corresponding function types. In that way information about added/removed nodes is provided, making the system scalable and tolerant to failures.

In an advantagous embodiment the information carrier protocol is TCP/IP, (Transmission Control Protocol/Internet Protocol).

Advantageously messages are sent out by the distribution function, when a resource has been selected (i.e. a selected particular function type instance) using common location transparent message passing. Advantageously the distribution function executes in the same context as the sending resource.

Particularly the distribution function is specific for a particular function type and it is supplied and registered by said particular function type. Alternatively a number of distribution functions are predefined.

According to the invention, a resource which intends to send a message to a resource of a given function type invokes a send operation. Said send operation comprises information about the message and about the destination function type.

In an advantageous embodiment, which however is not necessary for the functioning of the present invention, a node may invoke a connect operation for each of a number of function types with which the node intends to communicate. In that manner a general reference is provided for subsequent send operation commands.

Advantageously the function of a distribution application sending messages is decoupled from the configuration of the distributed application. Particularly the number of resources varies and the system scales automatically at runtime enabling use of newly added resources or the adaption to the loss of one or more resources (as well as entire nodes).

According to the invention a function type is given by the association of a global name and all instances of the same function type execute the same function. Particularly the distribution function is provided by an application and invoked by the send operation.

In an advantageous embodiment the information holding means comprises a distribution state table which contains the function type instances available for each of a number of function types. Which function types are included in the table may for example be provided through the node and the connect operation referred to above in which an indication is provided about which function types a node/resource intends to communicate with. However, this can also be decided in other manners. In one particular embodiment all function types are included but this depends on the complexity of the system and its capacity, storing means etc.

Advantageously is for each function type included in the distribution state table a function handling means provided which contains function type name, its associated distribution function and the function type instances, at least including the instance name. According to the invention a distributed function can scale without the application having to be rewritten or recompiled, i.e. it can start using newly added nodes (resources and nodes) and also handle the loss of nodes/resources.

In an advantageous embodiment a separately executing distribution service is provided for maintaining coherent information in some or all nodes. In one embodiment the separately executing distribution function is integrated in the managing system, or the communication system itself. In an alternative embodiment it is arranged hierarchically above the system.

A node in a distributed communication system which comprises a number of resources and communicates with other nodes via an interconnection network is therefore also provided. The resources are grouped into a number of function types wherein resources grouped into the same function type forms so called function types instances of said function type and they are at least to a given extent functionally equivalent. A node furthermore comprises information holding means which are provided for holding information about which function type instances correspond to a given function type. Furthermore it comprises a distribution function associated with the information holding means and which is used for selecting which function type instance that will be the actual receiver of a particular message and only function type information has to be given as address information when a node or a resource sends a message.

Particularly location transparent message passing is used when a message is sent to a selected function type instance. The information holding means comprises a distribution state table which contains the function type instances that are available for each of a number of function types. Particularly are, :for each function type in the table, function handling means provided which contain function type name, associated distribution function and function type instances, including at least instance name for each of the instances.

A method for sending messages in a distributed communication system comprising a number of nodes which are interconnected by an interconnecting network is therefore also provided. Each node comprises a number of resources. According to the method the resources are grouped into a number of function types depending on functionality. Furthermore information is stored about the resources grouped depending on functionality in a table, in each, or at least in a number of nodes which are decided according to any appropriate critera. The function type is given as addressing information when a message is to be sent to a resource of a given function type. The information in the table is used and the distribution function is invoked. The distribution function uses the message, the information in the information holding means relevant for the addressed function type and optional application defined information to select a particular instance. The selected instance is returned and the message is location-transparently sent to the selected instance. Advantageously the message comprises a step of continuously updating the information holding means. Thereby is in each node information provided about which particular function type instances of at least a number of function types actually are available for messages addressing the corresponding function types. This enables scaling up/down in runtime of the application.

A method of providing communication among applications executing at resources located at a number of different nodes in a network interconnecting said nodes, wherein the actual locations of the nodes are transparent to the applications, is also provided. It comprises the step of maintaining, in storing means in each node, information about resources depending on their functionality, which are grouped into a number of function type instance groups, one for each a particular function type, and accessing a distribution function by giving the function type of a resource as a receiver of the message and said distribution function using the information in the information holding means, the message and the selection algorithms to select a particular function type instance as the receiver of the message. Then the message is sent to the selected function type instance using location transparent message passing.

BRIEF DESCRIPTION OF THE DRAWINGS

The invention will in the following be further described in a non-limiting way and with reference to the accompanying drawings in which.

DETAILED DESCRIPTION

Figure 1A:
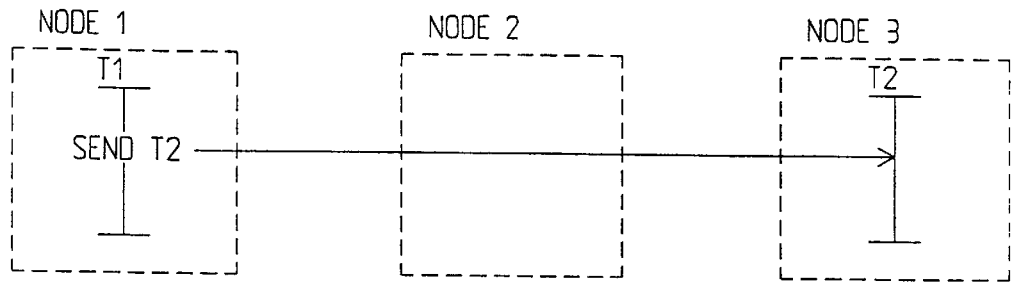
FIGS. 1A–1D illustrate thread communication in a location transparent system.
Figure 1B:
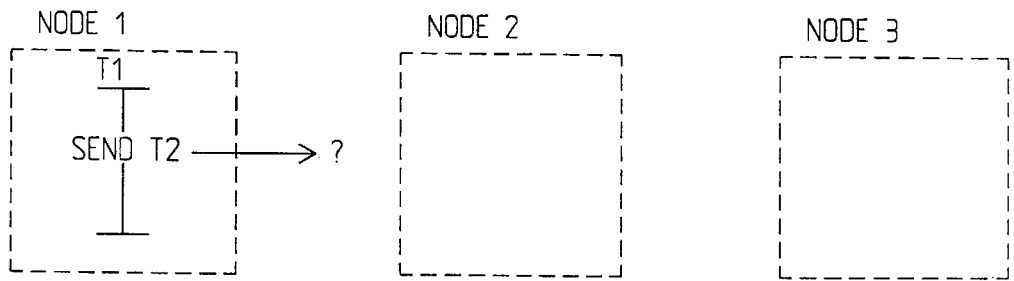
Figure 1C:
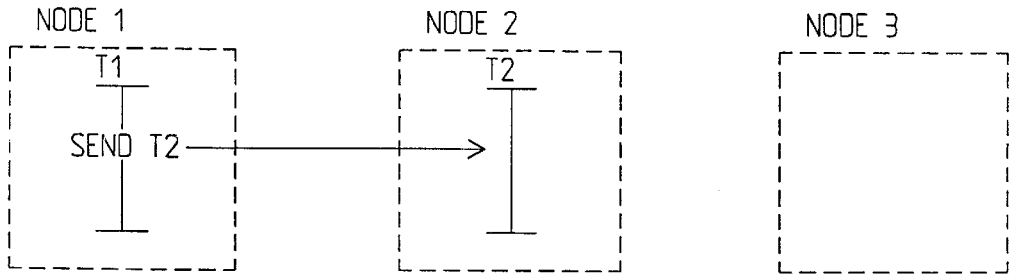
Figure 1D:
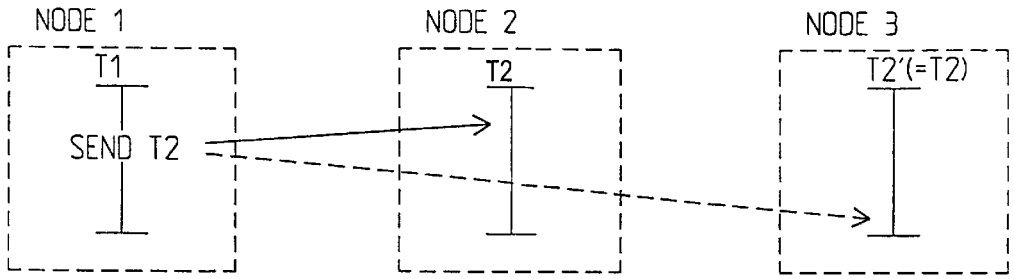
Figure 2:
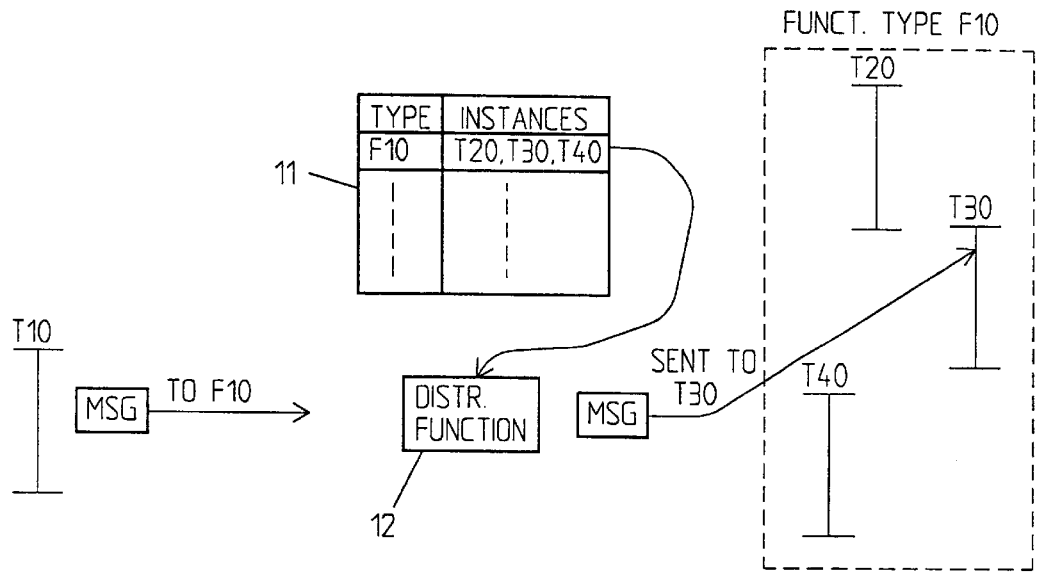
FIG. 2 in a simplified manner illustrates the sending of a message according to the invention.

According to the invention messages are communicated based on function type. This way of communicating messages can be used in combination with a distributed platform and a distributed application and advantageously the complete system gets scalable and fault tolerant. According to the invention this is achieved through the way in which entities or resources such as for example processing resources in/out resources, storing resources, e.g. threads, queues etc. are addressed by an entity or a resource sending a message. Instead of using the name of a specific entity or a resource as the address, the function type is used. The function type denotes a number of different resources which are considered to be functionally equivalent to the extent that anyone of them is a possible recipient of a message sent to the function type. In the embodiment illustrated in FIG. 2 it is supposed that a resource of the kind thread, here T10, wants to send a message, MSG, and the address is given as the function type F10 of the receiver. In information holding means 11 function type instances T20, T30, T40 are instances of the function type F10. This so called distribution state information is held in each node, particularly computer node, and illustrates the currently available resources of any function type that, in this case, thread T10 has declared its intention to communicate with. The distribution function 12 performs the actual choice of a receiving entity and then chooses among the currently available function type instances T20, T30, T40 belonging to the addressed function type F10. The distribution function 12 is advantageously based on a number of modules so that it is easy to plug-in for example predefined functions. Alternatively user specific or application specific functions can be defined. Advantageously an algorithm is used for selecting the actual receiving function type instance. Of course any desired method can be used for selecting a receiving instance. In an advantageous embodiment an algorithm is used which gives the function type instance, here among the function type instances T20, T30, T40, having the lowest load. In this case it is supposed that T30 is selected. The message is then sent to T30 using location transparent communication. The use of message passing based on function type assumes that the distributed application itself is written using an application programming interface supplied by the function based message passing mechanism. This involves use of specific operations for assigning types to each sub task (process, thread etc.) in the application and using the communication operation supplied by the function based message passing mechanism. Function based message passing is based on abstracting the notion of an addressable entity or resource through the introduction of a function type for the resources. Resources or entities of the same type are assumed to be functionally equivalent to the extent that the choice between them makes sense as already discussed earlier in the application. The resources are thus grouped in different groups depending on function type. The message is passed to a function type rather than to a specific resource. Implicit in this operation is the actual choice of receiving resource which is implemented by the distribution function which is implicitly invoked as part of sending a message. The distribution function is a general function executing in the same context as the sending entity. Either it is an application specific function supplied and registered by the application or it is one of a number of predefined distribution functions according to different embodiments.

In a particular embodiment, to which the invention however not is limited, a resource invokes a connect operation for each type of resource it intends to communicate with. The result thereof is that a general reference is provided to the function type, which is used in subsequent message passing operations. A distributed application using function based message passing has the property that its function gets decoupled from its configuration, which means that it will not be dependent on the actual number of, or names of, entities or resources it communicates with since it only uses the name of the function type of the resource in communication operations. It should be noted that location transparency is not sufficient in order to obtain this property since even in a location transparent system different resources will rely on names of other entities to be valid. As a consequence thereof, the number of certain entities will be built into the application. According to the invention both the number of and names of resources may differ even at a runtime. This means that an application may scale automatically to make use of newly added resources as well as it will automatically adapt to the loss of a resource or an entire node. The function typing mechanism associates a global name with a specific functionality, normally in the form of a function written in some programming language. From a function type function instances are created which are separate flows of control (threads) executing the functionality associated with the function type. The information holding means holds information about the distribution state. At least to a given extent, the information associated with the creation of a function instance is distributed to all (or to a given number of) nodes so that (all) nodes know which instances of a particular function type exist in the system. According to different embodiments the distribution of the state information may vary and it does not have to be completely coherent in all nodes, for example some nodes may be selected/excluded or some delay may be accepted in some cases etc. The distribution function is associated with the function type and it is implicitly invoked when a message is sent (through a send operation) to the function type. The distribution function uses a message, an optional application—defined information and the distribution status input data and returns the particular instance of the function type to which the message then is sent.

In a distributed system using message passing based on function type, each node comprises a distribution state table, a distribution function table and a distribution manager. The distribution state table contains information relating to all receiving functions, in the form of a state entry which contains the name of the function, the location transparent names of all receivers belonging to the function, and a name of a distribution function. The distribution function table contains the implementation of all distribution functions used on each node. Normally this is a code library, which is either statically or dynamically linked to the programs executing on the node. The distribution manager is a server entity (a thread or a process) which receives requests from other nodes regarding updates of, or searches for, information in the state table. It is assumed in the following implementation description, that a service for location transparent message passing is available. Furthermore, it is assumed that this service uses addresses of a type denoted by the name EntityAddress.

Figure 3:
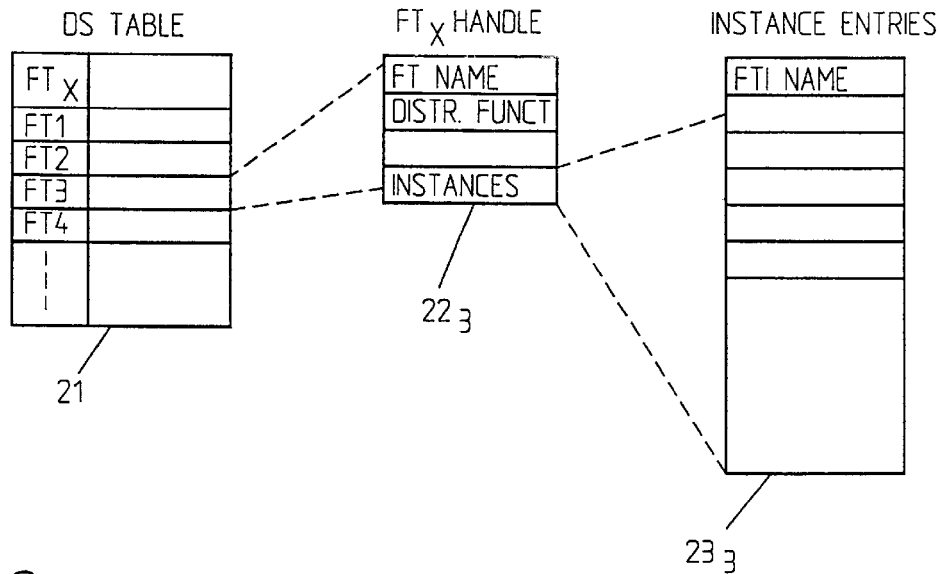
FIG. 3 is a figure similar to FIG. 1 but somewhat more detailed.

FIG. 3 schematically illustrates the main data structures used for the provision of function based message passing according to the invention which as discussed above advantageously are provided in each node. The implementation of function based message passing is based on three data structures, which together form the distribution state. The first data structure is the actual Distribution State (DS) table 21 which consists of records, called Function Type (FT) handles $22_3$. The DS table 21 is implemented as an array of FT handles $22_3$:

DStable:array of FThandle:

The FT handles $22_3$ have the following (pseudo-code) definition:

record (
    FTname:NameType;
    DistrFcn:DistrFunctionType;
    Instances:array of FTIentry;
) FThandle;

An FT handle holds the name of the FT it represents, along with a reference to the distribution function to be used when choosing among the function type instances, also called FTI:s. The last part of the FT handle consists of an array of FTI entries $23_3$, which has the following definition:

record (
    FTname:EntityAddress
) FTIentry;

The type of an FTI name is assumed to be the same as the type of addresses used by the underlying location-transparent message passing mechanism. A distribution function should be a function which takes three parameters: a message, some application defined distribution information and finally an array of FTI entires:

FTIname:DistrFunctionType(Message,DistrInfo, Instances);

The distribution function should return one FTI name which is the reciever of the message chosen by the distribution function. If the distribution function fails to make a choice, it should return a NULL pointer or some other form of indication of failure.

FIG. 3 can also be said to illustrate the information holding means provided in a node. It comprises the distribution state table (DS table) 21 containing the resources of a number of function types here called Function Type 1, Function Type 2, Function Type 3, Function Type 4 (FT1, FT2, FT3, FT4 . . . ) etc. For each function type a function type handle means also called $FT_x$ handle is provided. In the figure handle means $22_3$ for FT3 is illustrated. The address used in the send operation is the name of a function type rather than the name of a function type instance as referred to above. The distribution agent is responsible for selecting among the available function types or function type instances, FTIs when a packet is sent to a function type.

The distribution function is provided by the application and as referred to earlier it is implicitly invoked as part of the above mentioned send operation. The implementation of the distribution agent is based on the DS table 21 in which all information needed to make a choice among the FT instances is stored. The DS table is shared among all FTI:s in an address space. An address space is here defined as a part of the overall distributed platform which has the property that any two entities or resources (such as tasks) existing in the same address space can communicate by writing and reading the same memory, i.e. they share memory address space. In a platform using a conventional UNIX-like operating system, an address space would be equivalent to a process.

A distributed platform is seen as consisting of a number of processors connected by an interconnection network which allows processors to exchange messages. A distributed application is here seen as consisting of a number of tasks, each of which represents a distinct part of the functionality of the overall application. Tasks communicate by sending messages to each other and each task is said to reside in a specific address space. A task generally denotes a functionally separate and independent flow of control. Tasks can be implemented in different ways depending on the underlying operating system and may for example be implemented as some kind of lightweight processes or threads. However, also other alternatives are of course possible.

As can be seen from FIG. 3 the information in the table is organized into a number of function type or FT handle means (of which only the one relating to FT3 $22_3$ is shown) each of which in turn contains a list $22_3$ of instance entries. There is one FT handle means for each FT that any FTI wants to communicate with. An FT handle in turn contains a number of FTI entries each of which describes one of the instances corresponding to the relevant function type FT. Furthermore the FT handle $22_3$ contains the distribution function provided by the application.

Advantageously the distribution agent is to a great extent transparent to the programmer of the application. However, there is one explicit operation associated with distribution agents by which a function type instance declares its intention to communicate with a particular function type. This operation causes the creation of the FS table information for a specific function type. In the following the operations associated with the distribution agent will be more thoroughly described.

The DS table 21 holds all the application function type handle means $22_3$, . . . (FT handles). The FS table 21 enables the making of updates of the state of a distribution agent such as for example adding or removing instance entries as function type instances or FTIs are created/removed.

A number of distribution functions may be predefined in an advantageous embodiment. This is however not necessary for the functioning of the present invention, they may also be user defined. Of course may also other and/or different distribution functions be defined. However, some examples on predefined distribution functions are given below, e.g. the function choosing a receiving FTI in the same address space as the sender. If no such FTI exists, a NULL instance entry pointer is returned. Another predefined distribution function that may be provided is one that chooses the closest FTI, i.e. the FTI to which the latency of communicating a message is the smallest.

Still another example on a distribution function that may be predefined is a function choosing a specified destination FTI. The destination FTI should be supplied in the first parameter of the distribution function in the form of a pointer to a value. If this value is not a valid FTI name, the distribution function will return a NULL instance entry pointer. Still another function relates to the choosing of FTI in the specified address space. The address space is supplied in the first parameter of the distribution function in the form of a value. According to a further example a function is defined which chooses a local FTI provided the load of that FTI is below a certain threshold defined in the distribution function. If the load however exceeds the given threshold value, then the FTI having the lowest load is returned. Load is here defined as the size of the queue associated with a particular FTI.

Basically there are four different operations an application program uses in order to take advantage of the function based message passing services. The first operation is used by an entity to indicate that it should belong to a certain function type:

RegisterFTI( FTname:NameType, FTIname:EntityAddress );

This operation indicates that the FTI with the name given as a second paramter should belong to the function type given as a first parameter. It causes the local distribution state table to be updated in the following way:

If no state table entry exists for the given FT, such an entry is created. Otherwise the existing entry is used. The state table entry is then updated to reflect the addition of an FTI, i.e. a new FTI entry is added to it. Thereupon, the distribution manager is informed about the new FTI, and broadcasts the addition of the FTI to all other nodes in the system, using an ADD_INSTANCE request as will be further discussed below.

Another operation is used in order to remove an FTI from an FT:

RemoveFTI( FTname:NameType, FTIname:EntityAddress );

After an invocation of this operation, the given FTI is no longer part of the given FT. The operation first looks up the FT in the local distribution state table. If an FT handle is found, the array of FTI entries is updated so that the FTI to be removed is no longer found in the array. Thereupon, the distribution manager is invoked to send a REMOVE_INSTANCE request (as will be further discussed below) to all other nodes in the system.

In an advantageous embodiment a so called connect operation is implemented. This is however not necessary for the functioning of the invention but it is advantageous in so far as it reduces the amount of unnecessary information. The connect operation is used by an entity in order to indicate its intention to communicate with a particular function type FT.

FThandle:Connect( FTname:NameType );

This operation looks up the given FT in the distribution state table. If an FT handle is found, no further actions are taken. If no FT handle exists, a new FT handle is added to the distribution state table. The array of FTI entries in the new FT handle is initially empty. The distribution manager is then invoked to send out a GET_INSTANCES request for the FT. Such a request is sent out to all the other nodes in the system, in some well-defined order, until some node responds with a non-empty UPDATE_INSTANCES request. The contents of this request is used to update the array of FTI entries in the newly created FT handle.

The Connect operation returns a reference to the FT handle for the FT for which the Connect operation was invoked. This FT handle is subsequently used as address when Send operations are performed:

Send( FT:FThandle,msg:MessageType, DistrInfo:InfoType )

The Send operation sends the given message to the function type given as a first parameter, in the form of an FT handle. In doing this, the Send operation performs the following actions:

First it calls the distribution function which is part of the FT handle, using the message, the distribution information given as parameter, and the array of FTI entries also found in the FT handle, as parameters. The distribution function then returns an FTI name which is used as address when sending the message, using the underlying location-transparent message passing service.

In an alternative implementation, as referred to above, the Connect operation described above could be left out, and the send operation could take an FT name as destination address instead of an FT handle:

Send( FTname:NameType,msg:MessageType, DistrInfo:InfoTYpe)

In this implementation, the Send operation is assumed to perform the same actions as the Connect operation, the first time a Send operation to a specific FT is attempted on a node. It also means that the Send operation must search the local distribution state table in order to find the correct FT handle, whenever sending a message.

In order to assure that information contained in different nodes of the system is uniform, at least to a given extent, a distribution manager is advantageously provided in each node. This is however separate from the application but it is associated with the table, the DS table distribution manager is an independent executing entity either integrated in the operation system or arranged in a layer above the operation system. This is handled completely separately from the application.

The distribution manager in a node should be able to receive and handle the following requests from distribution managers on other nodes in the system (each type of request is described by its name and the data contained in the request):

ADD_INSTANCE( FTname:Name Type, FTIname:EntityAddress )

When receiving this request, the distribution manager looks up the given FT in the local distribution state table. If the FT is not found, the request is ignored. Otherwise, the FT handle found in the distribution state table is updated by adding the new FTI contained in the request, to the array of FTI entries in the FT handle.

REMOVE_INSTANCE( FTname:NameType, FTIname:EntityAddress)

The request causes the distribution manager to look up the given FT in the local distribution state table. If the FT is not found, the request is ignored. Otherwise, the FTI contained in the request is removed from the array of FTI entries found in the FT handle. However, if the FTI cannot be found in the FT handle, the request is ignored.

UPDATE_INSTANCES( FTname:NameType, Instances:array of EntityAddress )

Upon receiving this request, the distribution manager first checks if the array of FTI entries contained in the request is non-empty. If not, the request is ignored. Otherwise, the distribution manager loos up the FT in the distribution state table. If no FT handle is found, the request is ignored. If an FT handle exists, the array of FTI entries in the FT handle is updated to form the union of the FTI names in the received request and the array of FTI entries already in the FT handle.

GET_INSTANCES( FTname:NameType, Requester:EntityAddress )

A request of this type, causes the distribution manager to look up the given FT in the local distribution state table. If no FT handle is found, an UPDATE_INSTANCES request with an empty array of FTI names is sent to the entity with the address contained in the GET_INSTANCES request (under normal operation, this is the address of the distribution manager which sent the GET_INSTANCES request) If an FT handle is found, then an UPDATE_INSTANCES request containing an array of the FTI names found in the FT handle is sent to the requester address.

In the embodiment the relevant data structures are defined using C-syntax. However, any programming language may of course be used.

Figure 4:
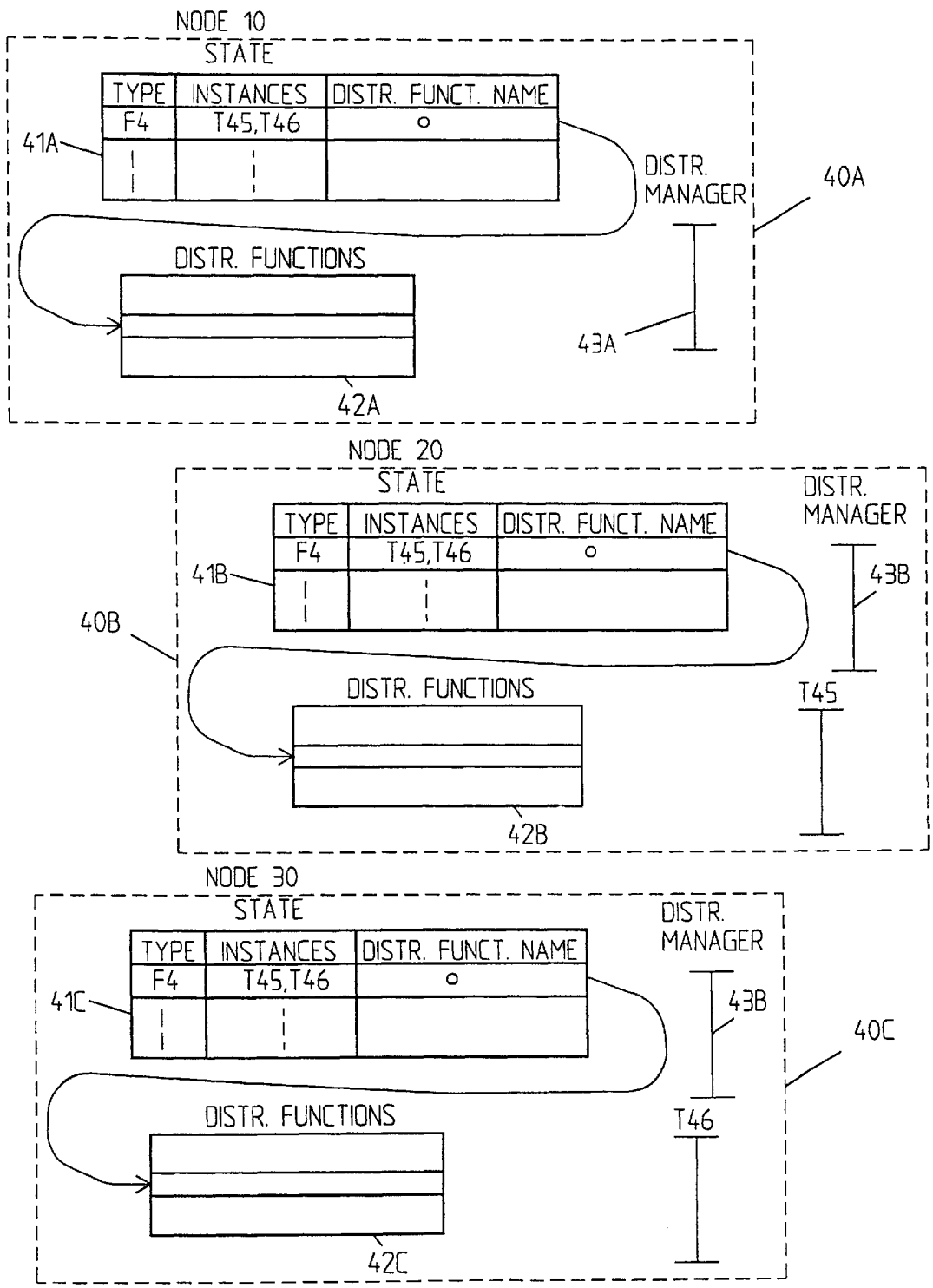
FIG. 4 is a simplified view of a system.

FIG. 4. is a simplified system view illustrating a distributed system implementing function based sending of messages according to the invention. In FIG. 4 three nodes, node 10, node 20, node 30 are schematically illustrated. Each node comprises an information holding means 40A, 40B, 40C, comprising a state table 41A, 41B, 41C, a distribution function table (corresponding to function type handle means as discussed above) and a distribution manager, 43A, 43B, 43C which is a server entity, e.g. a thread or a process, which receives requests from other nodes regarding updates of, or searches for information in the state table. As discussed above the respective state tables contain information about all receiving functions or resources in the form of a state entry containing the name of the function, the location transparent names of all receivers/resources belonging to the function and a name of a distribution function. In this figure is merely illustrated function type 4 and the resources T45 (in node 20) and T46 (in node 30) respectively. In the distribution function tables the implementation of all distribution functions used on each node are contained. Normally this is a so called library which either is statically or dynamically linked to the programs executing on the node.

Figure 5:
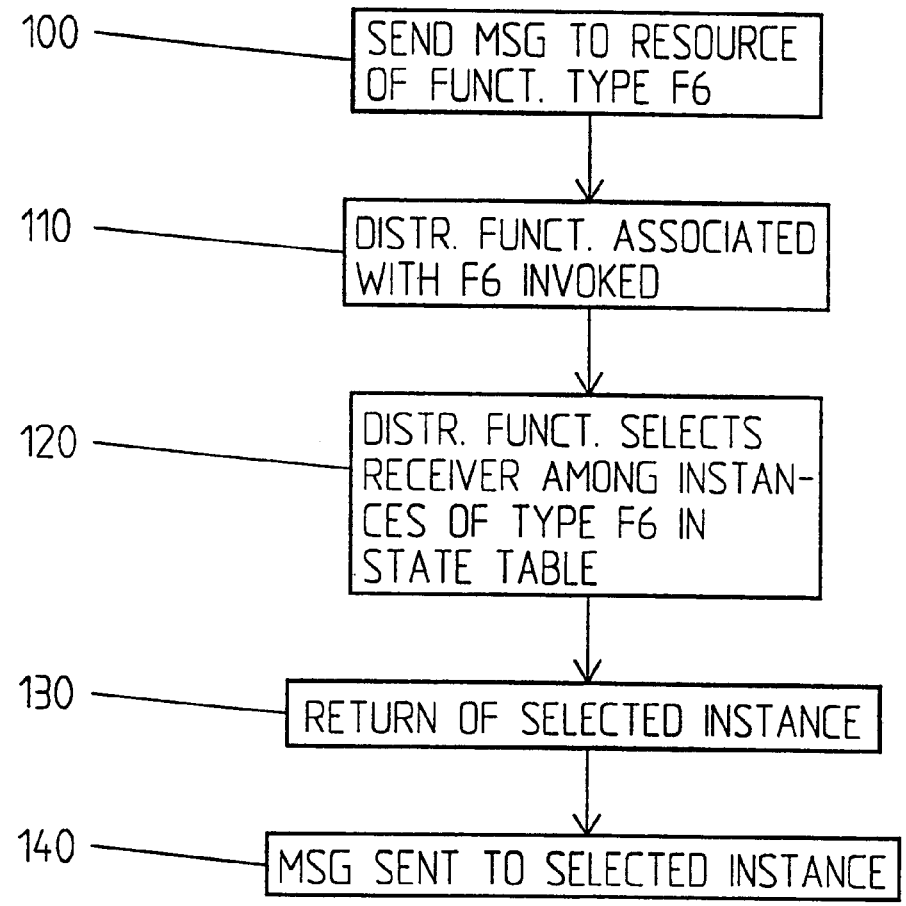
FIG. 5 is a flow diagram describing the sending of a message according to a first embodiment.

FIG. 5 is a simple flow diagram illustrating the sending of a message through invoking a send operation without any previous connect operation having been invoked. Thus, a send operation relating to the sending of a message to a resource of function type F6 is invoked, 100. The distribution function associated with function type F6 is then implicitly invoked, 110. The distribution function associated with function type F6 then selects a receiver, i.e. a function type instance among the instances of type F6 in the relevant state table, 120. As referred to above some appropriate algorithm can be used. The distribution function then returns the selected instance, 130, and the message is sent to the selected instance, 140 using location transparent message communication.

Figure 6:
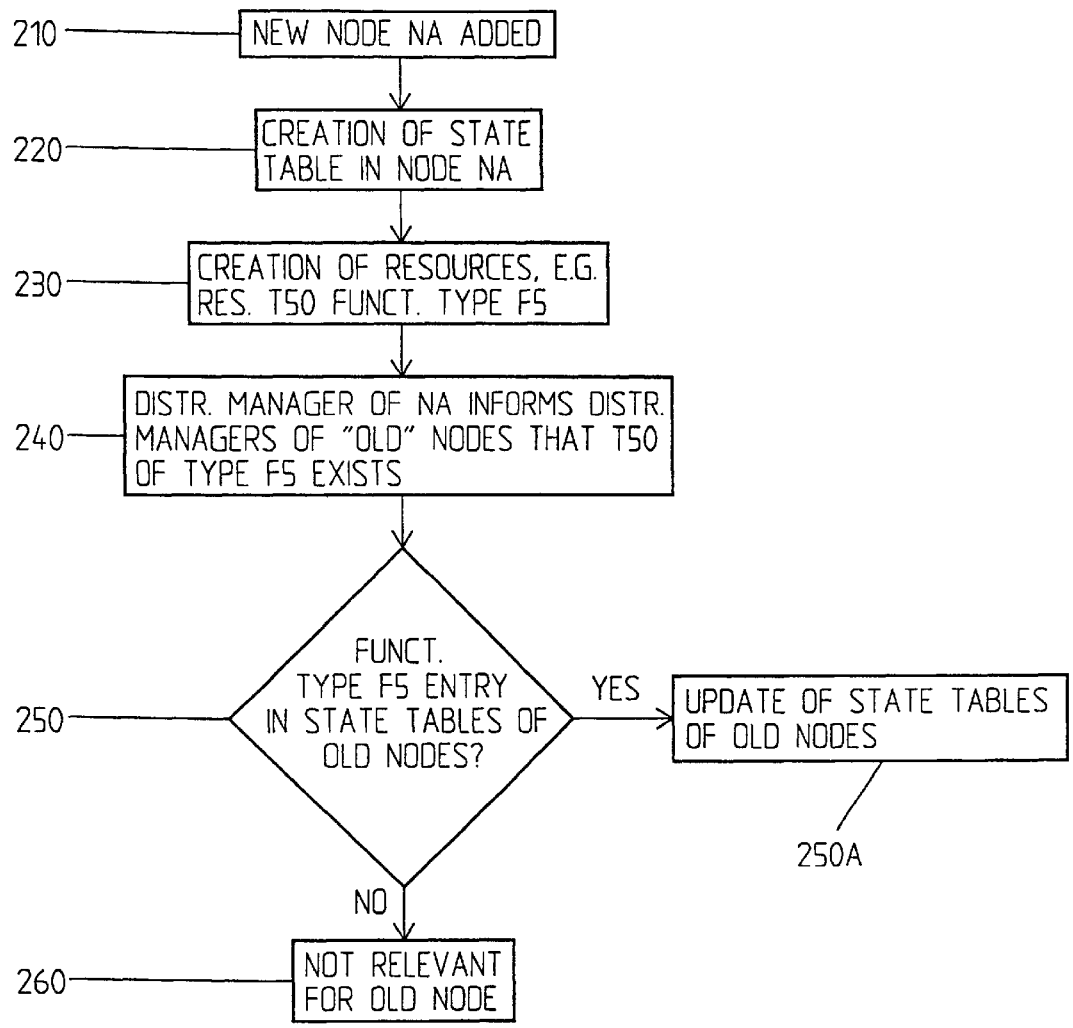
FIG. 6 is a flow diagram describing the procedure when a new node is added.

FIG. 6 is a flow diagram illustrating the adding of a new node to a system. When a new node, here called node NA, is added, 210, a state table is created in the new node NA, 220. A distribution function table is then loaded into the node NA. It is then supposed that a new receiving entity or resource called T50 of function type F5 is created, 230. The distribution manager of NA then informs the other distribution managers, for example through a broadcast message, about the existence of resource T50 and that its function type is F5, 240. In each "old" node is then examined if there is any function type F5 in the respective table, 250. If yes, the respective state tables in the "old" nodes are updated, 250A. If however there is no such entry in the "old" node, resources of function type FS are not relevant for that particular "old" node, 260. In an alternative embodiment function type FS may be introduced into the state table of an old node containing no information whatsoever thereon, for example in a system in which it is supposed that all nodes should have information about all resources or if no connect operations are implemented.

Figure 7:
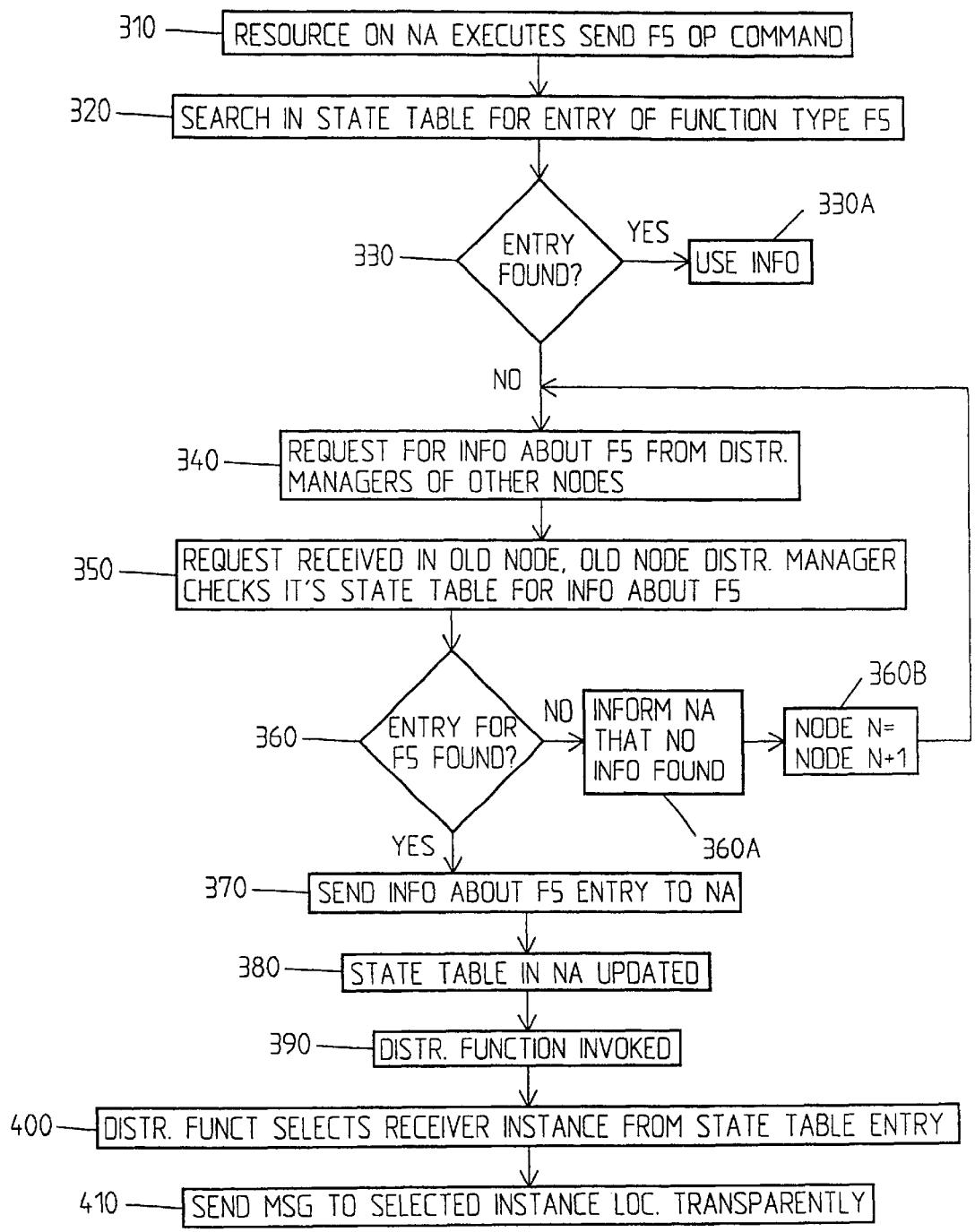
FIG. 7 is a flow diagram describing the sending procedure.

FIG. 7 is a flow diagram illustrating the case when a send operation is executed by some resource in the new node of FIG. 6. Thus a resource in NA executes a send message to type F5 operation command, 310. A search is then performed in the state table for an entry of function type F5, 320. If an entry is found, the corresponding information is used, 330A. If no send operation (or connect operation) has been performed previously, no entry will be found. Node NA then requests the distribution managers in the other nodes of the system (in some well defined order) to provide information relating to function type F5, 340. When such a request is received in an old node, the distribution manager of the old node checks its state table to see if there is any information about function typ FS, 350. A check is then performed to see if there can be found any entry for function type F5, 360. If no entry relating to function type F5 is found, the distribution manager of the concerned node responds to the requester with a message containing the information that no entry was found, 360A. The next node to which the request for information about function type F5 will then be the next node according to a given order, 360B and the procedure continues from step 340 and onwards until an entry relating to function type F5 is found in a node. This entry is then sent back as a response to the requester, i.e. NA, 370. When NA receives a message with information about an F5 entry, it stops sending requests to other nodes and the state table in NA is updated, 380. As part of the execution of the send operation, the distribution function is drawn from the distribution function table using the information found in the newly received state entry and the distribution function is invoked using the list of receivers from the state entry as arguments, 390. The distribution function then selects a receiver from the state table entry as a result, 400, and the message is sent to the selected instance using location transparent message passing, 410.

Figure 8:
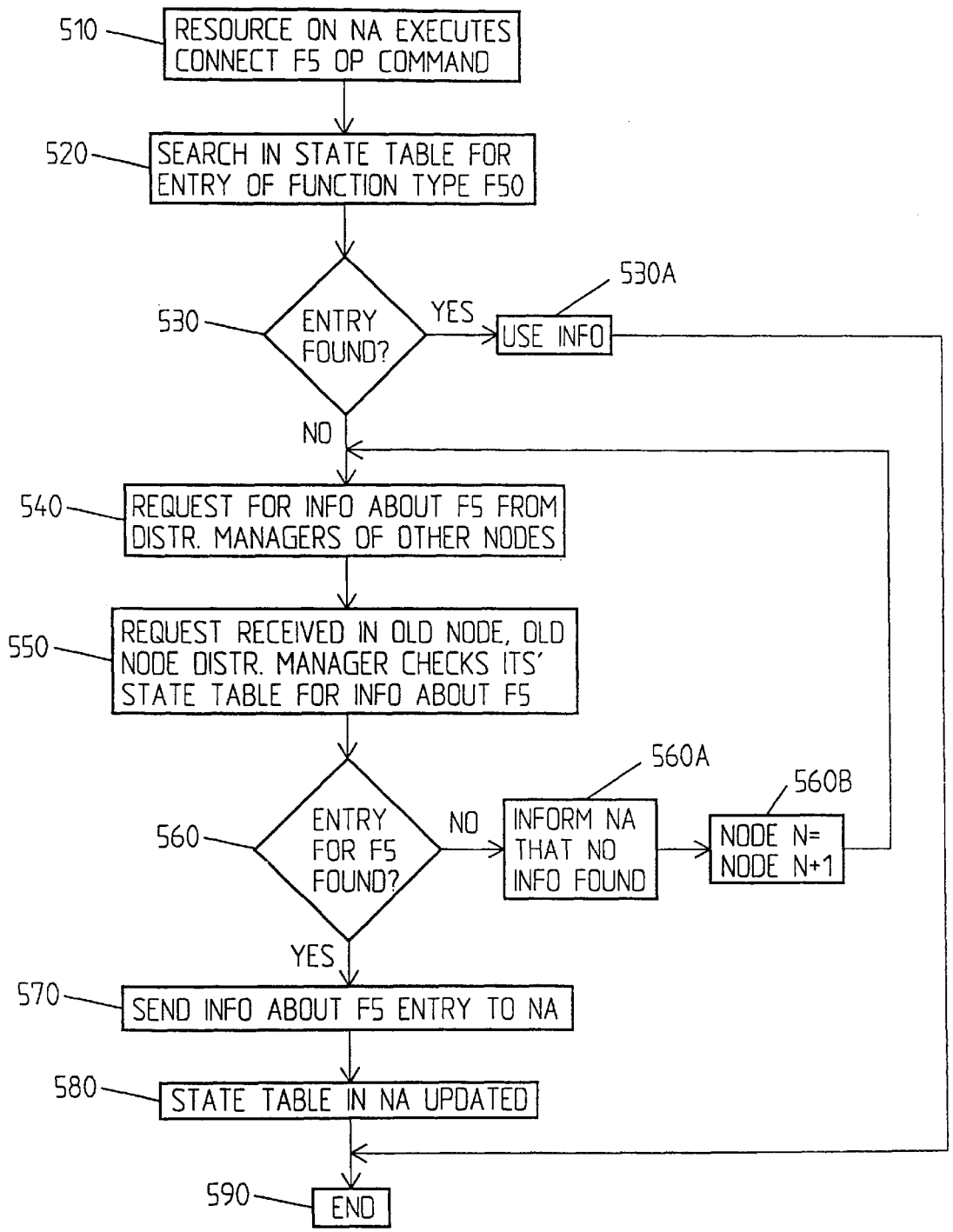
FIG. 8 is a schematical flow diagram describing a connect operation.

The flow diagram illustrated in FIG. 8 corresponds to that of FIG. 7 with the difference that the called operation is a connect operation as described earlier in the application. However, the flow then finishes with the updating step, 580 in which the state table in node NA is updated. Steps 520–570 are similar to the steps as illustrated with reference to FIG. 7.

Figure 9:
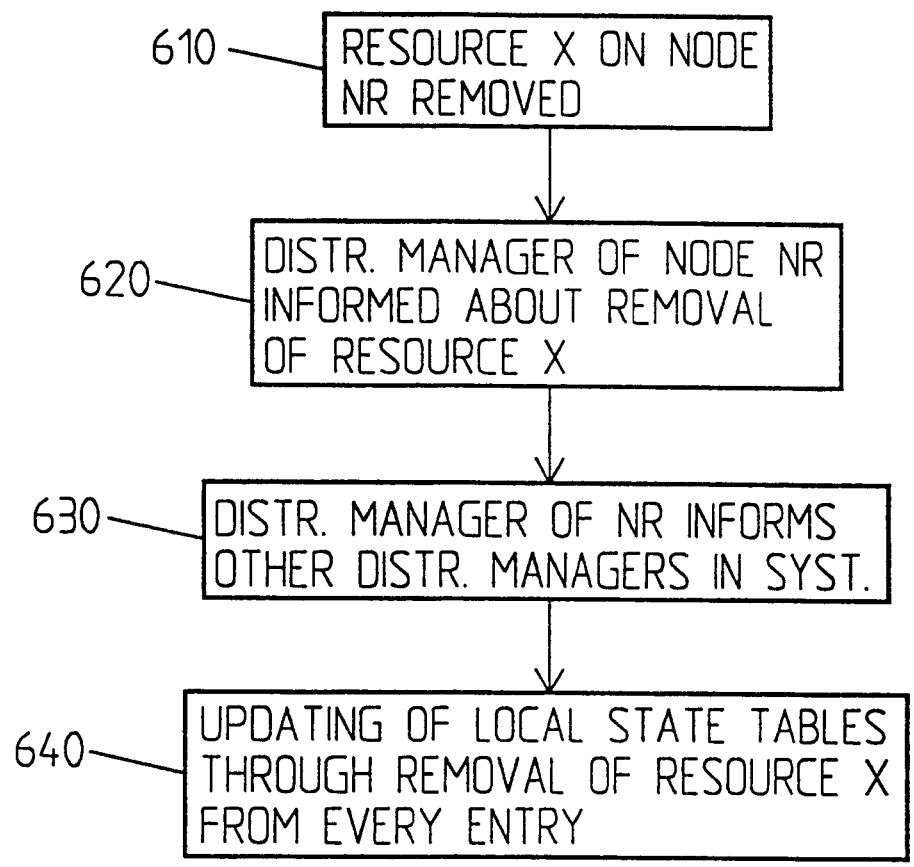
FIG. 9 is a flow diagram describing the procedure when resources are removed.

Resources can also be removed from a system. It is here assumed that an entire node is removed and hence also all resources/receivers provided on that node. FIG. 9 is a flow diagram schematically illustrating an orderly scale down in which case the resources or the receivers are removed prior to the removal of the node itself.

Thus it is assumed that a resource X on node NR is removed, 610. The distribution manager on the node to be removed is notified of the removal of resource X, 620. The distribution manager of node NR then informs the other distribution managers of the system, for example through broadcasting the corresponding information, 630. The other distribution managers then update their local state tables by removing resource X from any entry in which it may occur, 640.

If on the other hand an unexpected scale down occurs, for example because of a hardware failure, the distribution manager is not able to broadcast the information that all resources or receivers on that node are removed. Thus, the state tables may contain incorrect information. It is however assumed that means are provided for detecting such situations, such as for example a supervising mechanism or similar which is independent of the function based message passing mechanism itself or that it is detected through the failure to communicate with the receiver on the removed node in which case the distribution manager of the sending node can broadcast this information to all other distribution managers.

The invention is of course not limited to the illustrated embodiments but it can be varied in a number of ways within the scope of the appended claims.

What is claimed is:

1. A distributed communication system comprising a number of nodes, each of which comprises a number of resources, and which nodes are interconnected by an interconnection network, distributed applications being executed through sending of messages between resources in said nodes, wherein the resources are categorized or grouped into a number of function types, resources grouped into one and the same function type being functionally equivalent at least to a given extent so that a number of function type instances, each corresponding to a particular resource, are provided for each function type, each node comprises information holding means keeping information about which resources/function type instances correspond to a given function type, distribution functions being associated with said information holding means, and distribution functions for selecting a receiving function type instance among the instances available in the information holding means, and a resource of a sending node sending a message only gives the function type of the resource as address information, and the distribution function selects which resource/function type instance will be the receiver among the function type instances associated with the input function type so that messages from a sending resource are sent independently of the location of the resources with which a sending resource communicates as well as independently of the number and names thereof, wherein the distribution function executes in the same context as the sending resource, is specific for a particular application function, and is supplied and registered by a particular application function.

2. A distributed communication system according to claim 1, wherein the resources comprise processing resources and/or input/output resources and/or storing resources.

3. A distributed communication system according to claim 1, wherein the information holding means are continuously updated so that in each node information about which resources of at least a number of function types actually are available for messages addressing the corresponding function types so that information about added/removed nodes is provided, thus making the application sending the message scalable.

4. A distributed communication system according to claim 1, wherein the information carrier protocol is TCP/IP.

5. A distributed communication system according to claim 1, wherein messages are sent on by the distribution function to a selected resource/function type instance using common location transparent message passing.

6. A distributed communication system according to claim 1, wherein a number of distribution functions are predefined.

7. A distributed communication system according to claim 1, wherein a resource intending to send a message to a given function type invokes a send operation comprising information about the message and the function type.

8. A distributed communication system according to claim 1, wherein through invoking a connect operation for each of a number of function types with which a node intends to communicate, a general reference is provided for subsequent send operation commands.

9. A distributed communication system according to claim 1, wherein the functionality of the distributed application sending messages is decoupled from the configuration of the distributed application.

10. A distributed communication system according to claim 3, wherein the number of resources/function type instances varies at runtime so that the system scales automatically, enabling use of newly added resources/adaptation to loss of one or more resources.

11. A distributed communication system according claim 1, wherein a function type is given by the association of a global name, and all instances of the same function type execute the same function.

12. A distributed communication system according to claim 7, wherein the distribution function is provided by an application and invoked by the send operation.

13. A distributed communication system according to claim 1, wherein the information holding means comprises a distribution state table and a distribution function table containing the resources/function type instances available for each of a number of function types.

14. A distributed communication system according to claim 13, wherein for each function type in the distribution state table a function handle means is provided containing a function type name, an associated distribution function and the function type instances/resources, including at least an instance name.

15. A distributed communication system according to claim 1, wherein distributed function can scale without the application having to be rewritten or recompiled.

16. A distributed communication system according to claim 1, wherein for maintaining coherent information in all nodes, a separately executing distribution service is provided.

17. A node in a distributed communication system comprising a number of resources and communicating with other nodes via an interconnection network, wherein the resources of the system are grouped into a number of function types, resources grouped into the same function type form function type instances of said function type and at least to a given extent are functionally equivalent, information holding means are provided for holding information about which resources/function type instances correspond to a given function type, a number of distribution functions are associated with said information holding means, said distribution functions being used for selecting which resource/function type instance will be the receiver of a particular message, and only function type information is given as address information when a node sends a message, wherein each distribution function executes in the same context as a sending resource, is specific for a particular application function, and is supplied and registered by a particular application function.

18. A node according to claim 17, wherein location transparent message passing is used for sending a message to a selected function type instance.

19. A node according to claim 17, wherein the information holding means comprises a distribution state table containing the resources or function type instances available for each of a number of function types.

20. A node according claim 19, wherein for each function type in the distribution state table a function handling means is provided containing a function type name, an associated distribution function and the function type instances including at least an instance name for each instance.

21. A method for sending messages in a distributed communication system comprising a number of nodes interconnected by an interconnection network, wherein each node comprises a number of resources, the method comprising the steps of:

grouping the resources of the system into a number of function types depending on functionality, storing information about the resources grouped depending on functionality in information holding means in each node, giving the function type as address information when a message is to be sent to a resource of a given function type, invoking a distribution function, said distribution function using the message, the information in the information holding means and optional application defined information to select a particular instance, wherein the distribution function executes in the same context as the sending resource, is specific for a particular application function, and is supplied and registered by a particular application function, returning the selected instance, and sending the message location transparently to the selected instance.

22. A method according to claim 21, further comprising the step of continuously updating the information holding means so that in each node information about which particular function type instances of at least a number of function types actually are available for messages addressing the corresponding function types is provided, enabling scaling up/down in runtime.

23. A method of providing communication among applications executing at resources located at a number of different nodes in a network interconnecting said nodes, wherein the actual node locations are transparent to the applications, the method comprising the steps of:

maintaining in storing means in each node information about resources which, depending on their functionality, are grouped into a number of function types, accessing a distribution function by giving the function type of a resource intended as a receiver of a message, said distribution function using the information in the information holding means relating to said function type, the message and a selection algorithm to select a particular function type instance as receiver of the message, wherein the distribution function executes in the same context as the sending resource, is specific for a particular application function, and is supplied and registered by a particular application function, and sending the message to the selected function type instance using location transparent message passing.

* * * * *